(12) United States Patent
Xie et al.

(10) Patent No.: US 12,371,603 B1
(45) Date of Patent: Jul. 29, 2025

(54) STRONG SALT-RESISTANT SELF-DEGRADATION PLUGGING AGENT FOR WATER-BASED DRILLING FLUID AND PREPARATION METHOD THEREFOR

(71) Applicant: Southwest Petroleum University, Chengdu (CN)

(72) Inventors: Gang Xie, Chengdu (CN); Qian Zhou, Chengdu (CN); Linlin Zhang, Chengdu (CN); Ruolan Wang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 19/070,894

(22) Filed: Mar. 5, 2025

(51) Int. Cl.
C09K 8/24 (2006.01)
C09K 8/20 (2006.01)

(52) U.S. Cl.
CPC ............... C09K 8/24 (2013.01); C09K 8/206 (2013.01)

(58) Field of Classification Search
CPC .................................. C09K 8/24; C09K 8/206
See application file for complete search history.

(56) References Cited

U.S. PATENT DOCUMENTS

| | | | |
|---|---|---|---|
| 12,215,274 B1 * | 2/2025 | Bai | .................... C09K 8/44 |
| 2020/0087562 A1 | 3/2020 | Maghrabi | |

FOREIGN PATENT DOCUMENTS

| | | | |
|---|---|---|---|
| CN | 105018051 A | | 11/2015 |
| CN | 106916320 A | * | 7/2017 |
| CN | 111662697 A | * | 9/2020 |
| CN | 112724946 A | | 4/2021 |
| CN | 114381243 B | | 4/2022 |
| CN | 116535671 A | | 8/2023 |
| CN | 118165715 A | | 6/2024 |
| CN | 118206977 B | | 6/2024 |
| CN | 118496830 B | | 8/2024 |

OTHER PUBLICATIONS

Liu ZH, "transforming biorefinery designs with'Plug-in processes oflignin' to enable economic waste valorization" «nature conunications» vol. 12, issue 1, Jun. 23, 2021 (Jun. 23, 2021).

* cited by examiner

Primary Examiner — Kumar R Bhushan
(74) Attorney, Agent, or Firm — Birchwood IP

(57) ABSTRACT

Disclosed are a strong salt-resistant self-degradation plugging agent for water-based drilling fluid and a preparation method therefor. The preparation method includes: modifying unsaturated polyhydroxyalkanoate by using 2-acrylamide-2-methylpropanesulfonic acid to prepare modified polyhydroxyalkanoate; modifying lignin by using an ammonium halide salt to prepare quaternized lignin; and melting and blending the quaternized lignin and the modified polyhydroxyalkanoate to obtain the strong salt-resistant self-degradation plugging agent for water-based drilling fluid. The preparation method is mature and reliable, and is suitable for industrial production. The plugging agent has strong salt resistance and good stability, and has a degradation rate less than 15% within 7 days, which can effectively plug micron-sized fractures in shale formations. Meanwhile, the plugging agent may be directly added to the water-based drilling fluid, and has little effect on the rheology. With addition of the plugging agent, the high-temperature and high-pressure filtration loss of the drilling fluid is significantly reduced.

7 Claims, 2 Drawing Sheets

STRONG SALT-RESISTANT SELF-DEGRADATION PLUGGING AGENT FOR WATER-BASED DRILLING FLUID AND PREPARATION METHOD THEREFOR

CROSS-REFERENCE TO RELATED APPLICATIONS

This application claims priority to Chinese Patent Application No. 202411490545.5, filed on Oct. 24, 2024, which is hereby incorporated by reference in its entirety.

TECHNICAL FIELD

The present application relates to the technical field of oilfield chemistry, and in particular, to a strong salt-resistant self-degradation plugging agent for water-based drilling fluid and a preparation method therefor.

BACKGROUND

The shale formation has well-developed micron-sized pores and fractures. During the drilling process, plugging agents with different particle sizes are required for graded plugging to ensure the stability of the well wall. However, conventional polymer plugging agents are difficult to degrade in the natural environment, causing environmental pollution. In addition, the conventional polymer plugging agents have limited stability in high-temperature and high-pressure downhole environment, which can easily lead to reservoir damage. Although acidizing and fracturing techniques can increase seepage channels, this significantly increases construction costs. In addition, conventional organic and inorganic plugging agents have insufficient salt resistance, resulting in unsatisfactory plugging effects and high filtration loss of drilling fluid, which can easily lead to serious underground complex accidents such as well collapse, drill sticking, and obstruction. Therefore, it is necessary to develop a self-degradable plugging material, which can not only form a compact plugging on a well wall to improve the stability of the well wall, but also degrade in the later stage of well completion, restore the reservoir permeability, and achieve the effect of restoring the fracture conductivity during the completion and production stage.

At present, polylactic acid with a good degradation effect degrades rapidly under high temperature and easily loses strength, and cannot meet the requirement for the lost circulation control material in the reservoir section during drilling and completion. For drilling fluid, the ideal self-degradable plugging material is degraded slowly or not degraded in the initial stage to achieve lost circulation control during the drilling stage, and degrades quickly and fully in the later stage to reduce damage to the reservoir. According to the performance requirements of oil and gas drilling on the self-degradable plugging material, the degradation rate of the self-degradable plugging agent within 7 days needs to be less than 15%, so that the effects of stably plugging formation fractures and improving the stability of shale well walls can be achieved. At present, there are some temporary plugging agents prepared by degradable materials, such as a two-dimensional flexible temporary plugging agent for fracturing disclosed in CN118206977A, and a degradable ball shell-knot type temporary plugging agent for fracturing disclosed in CN118165715A. However, these temporary plugging agents are all used for fracturing construction, have short degradation time, cannot meet the long-term effective plugging of formation fractures, and are difficult to avoid the problem of drilling fluid invading the formation.

SUMMARY

To solve the problems, an objective of the present application is to provide a strong salt-resistant self-degradation plugging agent for water-based drilling fluid and a preparation method therefor. The plugging agent has good stability and degradability, has a degradation rate of less than 15% within 7 days, and can effectively plug micron-sized fractures in shale formations, thereby maintaining well wall stability and protecting reservoirs.

To achieve the above objective, the technical solutions of the present application are as follows:

A preparation method for a strong salt-resistant self-degradation plugging agent for water-based drilling fluid includes the following steps:

S1: preparing modified polyhydroxyalkanoate, including the following steps:

S11: uniformly dispersing 6-8 parts by weight of unsaturated polyhydroxyalkanoate, 3-4 parts by weight of 2-acrylamide-2-methylpropanesulfonic acid and 0.1-0.3 parts by weight of a dispersant in deionized water, and introducing an inert gas to remove oxygen in a mixed solution;

S12: adding 0.05-0.1 part by weight of an initiator into the mixed solution of S11, heating to 70° C. to 90° C., and reacting for 12 h to 16 h;

S13: naturally cooling a reaction product of S12, and drying in vacuum to obtain the modified polyhydroxyalkanoate;

S2: modifying lignin by using an ammonium halide salt to prepare quaternized lignin; and S3: melting and blending the quaternized lignin and the modified polyhydroxyalkanoate to obtain the strong salt-resistant self-degradation plugging agent for water-based drilling fluid.

In the present application, the unsaturated polyhydroxyalkanoate refers to polyhydroxyalkanoate having an unsaturated unit in a side chain, such as poly(3-hydroxyoctanoate-co-3-hydroxyundecanoate) (PHOU). The side chain of the unsaturated polyhydroxyalkanoate has a terminal reactive double bond, which is relatively active and can be chemically modified to introduce new functional groups to form functional polyhydroxyalkanoate.

The inert gas in the present application refers to a gas that does not react with each monomer, such as nitrogen and helium.

According to a specific embodiment of the present application, the dispersant is sodium dodecyl sulfate (SDS) or dehydrated sorbitol monooleate polyoxyethylene ether.

According to a specific embodiment of the present application, the initiator is potassium persulfate or ammonium persulfate.

According to a specific embodiment of the present application, the step S2 includes:

S21: dissolving 7-8 parts by weight of lignin and 3-4 parts by weight of ammonium halide salt in N,N-dimethylformamide, and adding an alkaline reagent to adjust a pH value to 11-12; and S22: stirring a mixture of S21 at 70° C. to 80° C. for 18 h to 24 h; after the reaction is completed, sequentially performing rotary evaporation, dialysis and purification, and lyophilization at −30° C. to −50° C. on a reaction product to obtain the quaternized lignin.

In the step S21, the alkaline reagent is a conventional reagent for adjusting pH, such as $K_2CO_3$ and NaOH.

According to a specific embodiment of the present application, the ammonium halide salt is 3-chloro-2-hydroxypropyltrimethylammonium chloride (CHPTAC) or diallyldimethylammonium chloride.

According to a specific embodiment of the present application, in the step S3, a mass ratio of the modified polyhydroxyalkanoate to the quaternized lignin is 1 to 3.

According to a specific embodiment of the present application, in the step S3, the melting and blending are performed at a temperature of 190° C. to 200° C., a specific blending time is related to a rotation speed and the like and may be selected based on a requirement. For example, when the rotation speed is 60 r/min to 65 r/min, the blending time is 6 min to 7 min.

A strong salt-resistant self-degradation plugging agent for water-based drilling fluid is prepared by using the above method.

Compared with the prior art, the present application has the beneficial effects as follows:

The plugging agent has good biocompatibility and degradability, can be self-degraded after stably plugging formation fractures, does not pollute the formation, and is grafted with sulfonic acid functional groups, so that the plugging agent has strong temperature resistance and salt resistance.

The plugging agent contains a lignin material and has good degradability and thermal stability; the quaternary ammonium functional groups are adsorbed on clay particles, so that the plugging agent can be well adsorbed on the formation surface, and the compactness of the plugging layer is improved; and meanwhile, through the hydration action of the quaternary ammonium functional groups, a solvation layer can be formed on a molecular chain of the plugging agent, the molecules of the plugging agent absorb water to expand, and the plugging capability on fractures is improved.

The plugging agent has good compatibility with water-based drilling fluid, effectively prevents the drilling fluid from permeating into the formation, prevents the occurrence of well collapse accidents, and enhances the stability of the well wall. The preparation method is mature and reliable, and is suitable for industrial production.

DESCRIPTION OF EMBODIMENTS

Figure 1A:
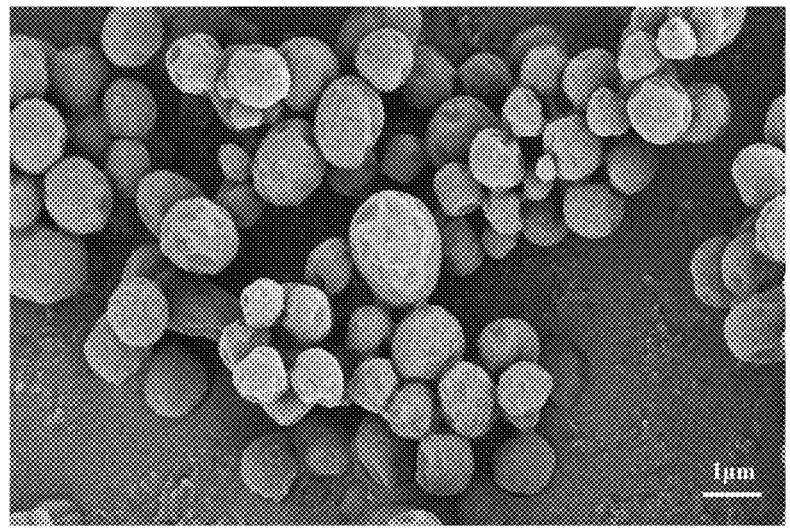
FIG. 1a is a scanning electron micrograph of a plugging agent of Example 1 before degradation.

The specific implementations of the present application will be described clearly and completely below with reference to examples. It is clear that the described embodiments are merely a part rather than all of embodiments of the present application.

In the following examples, poly(3-hydroxyoctanoate-co-3-hydroxyundecanoate) (PHOU) was purchased from Beijing Weigou Workshop Biotechnology Co., Ltd.; lignin and dehydrated sorbitol monooleate polyoxyethylene ether were purchased from Sigma-Aldrich (Shanghai) Trading Co., Ltd.; 2-acrylamido-2-methylpropanesulfonic acid, sodium dodecyl sulfate, potassium persulfate, ammonium persulphate, $K_2CO_3$ and NaOH were purchased from Sinopharm Chemical Reagent Co., Ltd.; 3-chloro-2-hydroxypropyltrimethylammonium chloride (CHPTAC) and diallyldimethylammonium chloride were purchased from Shanghai Aladdin Biochemical Technology Co., Ltd.; and N,N-dimethylformamide was purchased from Shanghai Acmec Biochemical Technology Co., Ltd.

Example 1

S1: Preparation of modified polyhydroxyalkanoate: uniformly dispersing 6 parts by weight of PHOU, 3 parts by weight of 2-acrylamido-2-methylpropanesulfonic acid and 0.1 parts by weight of sodium dodecyl sulfate in deionized water, introducing nitrogen and stirring for 1 h; then adding 0.05 parts by weight of ammonium persulfate into a mixed solution, heating to 70° C., and reacting for 16 h; after the reaction is completed, naturally cooling a reaction product, and then drying for 6 h at 60° C. under vacuum to obtain the modified polyhydroxyalkanoate.

S2: Preparation of quaternized lignin: dissolving 7 parts by weight of lignin and 3 parts by weight of 3-chloro-2-hydroxypropyltrimethylammonium chloride in 200 parts by weight of N,N-dimethylformamide, and adding NaOH solution to adjust a pH value to 11; stirring a mixture at 70° C. for 18 h; after the reaction is completed, concentrating the reaction mixture by rotary evaporation to remove N,N-dimethylformamide, and performing dialysis and purification and lyophilization at −30° C. for 3 h on a reaction product to obtain the quaternized lignin.

S3: Adding the modified polyhydroxyalkanoate and the quaternized lignin in a mass ratio of 3:1 into a torque rheometer, and performing melting and blending (at a temperature of 190° C. and a rotating speed of 60 r/min for 7 min) to obtain the strong salt-resistant self-degradation plugging agent.

Example 2

S1: Preparation of modified polyhydroxyalkanoate: uniformly dispersing 7 parts by weight of PHOU, 3 parts by weight of 2-acrylamido-2-methylpropanesulfonic acid and 0.2 parts by weight of dehydrated sorbitol monooleate polyoxyethylene ether in deionized water, introducing nitrogen and stirring for 2 h; then adding 0.07 parts by weight of potassium persulfate into a mixed solution, heating to 80° C., and reacting for 14 h; after the reaction is completed, naturally cooling a reaction product, and then drying for 5 h at 70° C. under vacuum to obtain the modified polyhydroxyalkanoate.

S2: Preparation of quaternized lignin: dissolving 7 parts by weight of lignin and 4 parts by weight of diallyldimethylammonium chloride in 200 parts by weight of N,N-dimethylformamide, and adding NaOH solution to adjust a pH value to 12; stirring a mixture at 75° C. for 22 h; after the reaction is completed, concentrating the reaction mixture by rotary evaporation to remove N,N-dimethylformamide, and performing dialysis and purification and lyophilization at −40° C. for 3 h on a reaction product to obtain the quaternized lignin.

S3: Adding the modified polyhydroxyalkanoate and the quaternized lignin in a mass ratio of 2:1 into a torque rheometer, and performing melting and blending (at a temperature of 200° C. and a rotating speed of 65 r/min for 6 min) to obtain the strong salt-resistant self-degradation plugging agent.

Example 3

S1: Preparation of modified polyhydroxyalkanoate: uniformly dispersing 8 parts by weight of PHOU, 4 parts by weight of 2-acrylamido-2-methylpropanesulfonic acid and 0.3 parts by weight of sodium dodecyl sulfate in deionized water, introducing nitrogen and stirring for 1.5 h; then adding 0.1 parts by weight of ammonium persulfate into a mixed solution, heating to 90° C., and reacting for 12 h; after the reaction is completed, naturally cooling a reaction product, and then drying for 4 h at 80° C. under vacuum to obtain the modified polyhydroxyalkanoate.

S2: Preparation of quaternized lignin: dissolving 8 parts by weight of lignin and 3 parts by weight of 3-chloro-2-hydroxypropyltrimethylammonium chloride (CHPTAC) in 200 parts by weight of N,N-dimethylformamide, and adding $K_2CO_3$ solution to adjust a pH value to 12; stirring a mixture at 75° C. for 22 h; after the reaction is completed, concentrating the reaction mixture by rotary evaporation to remove N,N-dimethylformamide, and performing dialysis and purification and lyophilization at −40° C. for 3 h on a reaction product to obtain the quaternized lignin.

S3: Adding the modified polyhydroxyalkanoate and the quaternized lignin in a mass ratio of 1:1 into a torque rheometer, and performing melting and blending (at a temperature of 200° C. and a rotating speed of 65 r/min for 6 min) to obtain the strong salt-resistant self-degradation plugging agent.

Comparative Example 1

S1: Preparation of quaternized lignin: dissolving 7 parts by weight of lignin and 4 parts by weight of diallyldimethylammonium chloride in 200 parts by weight of N,N-dimethylformamide, and adding $K_2CO_3$ solution to adjust a pH value to 11; stirring a mixture at 70° C. for 24 h; after the reaction is completed, concentrating the reaction mixture by rotary evaporation to remove N,N-dimethylformamide, and performing dialysis and purification and lyophilization at −35° C. for 3 h on a reaction product to obtain the quaternized lignin.

S2: Adding polylactic acid and the quaternized lignin in a mass ratio of 3:1 into a torque rheometer, and performing melting and blending (at a temperature of 200° C. and a rotating speed of 65 r/min for 6 min) to obtain the self-degradable plugging agent.

To further illustrate the effect of the plugging agent of the present application, performance tests were performed on the plugging agents in Example 1, Example 2, Example 3 and Comparative Example 1.

Test Example 1 (Scanning Electron Microscope Test Before and After Plugging Agent Degradation)

Figure 1B:
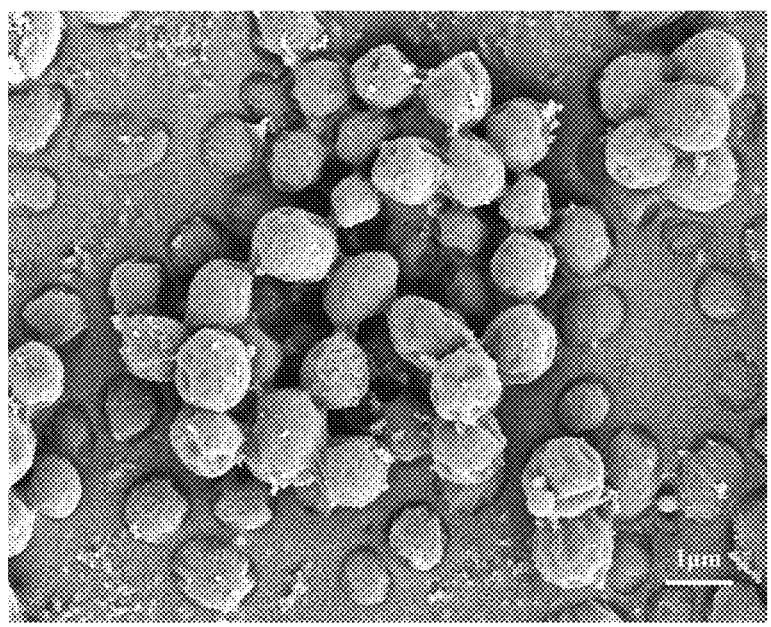
FIG. 1b is a scanning electron micrograph of a plugging agent of Example 1 after degradation.

The plugging agent prepared in Example 1 was placed in a high-temperature roller heating furnace and aged at 120° C. for 1 day, and the plugging agent before and after aging was subjected to scanning electron microscope microscopic analysis. The microscopic morphology of the plugging agent was observed under a scanning electron microscope. The plugging agent before aging is shown in FIG. 1a, which presents a spherical structure with a smooth surface. The plugging agent after aging is shown in FIG. 1b, the surface of the aged plugging agent becomes rough, and a large number of white irregular protrusions appear, but the overall shape still maintains a complete spherical structure, which indicates that the plugging agent has been degraded.

Test Example 2 (Self-Degradation Performance Test of Plugging Agent)

The plugging agents in Examples 1 to 3 and Comparative Example 1 were placed in a high-temperature roller heating furnace and aged at 120° C. The degradation rates of these plugging agents after different aging times were measured, and the degradation characteristics of these plugging agents were measured by the degradation rates.

The calculation formula of degradation rate is: $S=(W_1-W_2)/W_1 \times 100\%$ wherein S is the degradation rate; $W_1$ is a mass of the plugging agent before aging; and $W_2$ is a remaining mass of the plugging agent after aging.

Figure 2:
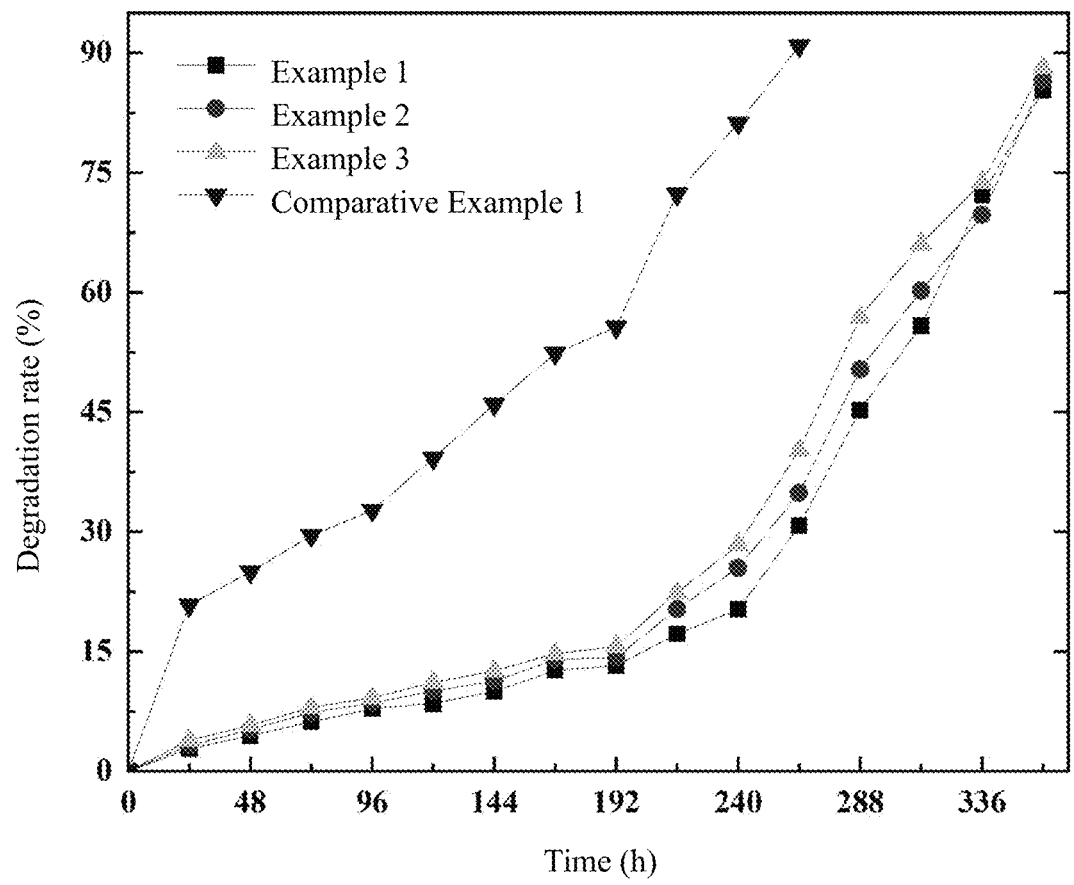
FIG. 2 is a graph showing degradation rates of plugging agents over time.

The test results are shown in FIG. 2. The plugging agents in Examples 1 to 3 degrade slowly, with degradation rates less than 15% within 7 days, which can better meet the requirements of fracture plugging and reservoir protection. The plugging agent in Comparative Example 1 degrades quickly, and the degradation rate after 24 h is greater than 20%, which cannot stably plug the formation fractures for a long time during the drilling process.

Test Example 3 (Salt Resistance Performance Test of Plugging Agent)

The original particle sizes of the plugging agents prepared in Examples 1 to 3 and Comparative Example 1 were tested, and then the four plugging agents were added to sodium chloride (NaCl) solutions with a mass percentage of 15%, 20%, 25%, and 30%, respectively. After stirring uniformly, the mixture was left to stand at room temperature for 1 day, and the particle sizes were tested respectively to obtain the median particle size $D_{50}$ of the plugging agents at different NaCl salt concentrations. As shown in Table 1, with the increase of the concentration of the NaCl solution, the median particle size of the plugging agents in Examples 1-3 changed slightly, and always remained at 1 μm to 3 μm, which indicates that the plugging agents have excellent salt resistance. After adding a salt solution with a mass fraction of 15%, the median particle size of the plugging agent in Comparative Example 1 increased from 2.05 μm to 6.52 μm, and with the increase of the concentration of the NaCl solution, the particle size increased significantly. It can be seen that this plugging agent has different degrees of agglomeration effect under the stimulation of the salt solution, and the salt resistance is worse than that of Examples 1 to 3.

TABLE 1

Median particle size $D_{50}$ (μm) at different NaCl salt concentrations

| Type | Example 1 | Example 2 | Example 3 | Comparative Example 1 |
|---|---|---|---|---|
| Original particle size | 1.72 | 1.51 | 1.05 | 2.05 |
| 15% NaCl | 1.87 | 1.60 | 1.33 | 6.52 |
| 20% NaCl | 2.36 | 1.84 | 1.46 | 9.18 |
| 25% NaCl | 2.59 | 1.99 | 1.62 | 14.64 |
| 30% NaCl | 2.97 | 2.36 | 2.15 | 18.71 |

Test Example 4 (Compatibility Test of Plugging Agent and Water-Based Drilling Fluid)

Preparation of water-based drilling fluid base slurry: 100 parts by weight of water, 3 parts by weight of bentonite, and 0.2 parts by weight of NaOH solid were added to a high-stirring cup and stirred for 10 min; under the high stirring state, 0.02 parts by weight of a coating agent potassium polyacrylate (KPAM) were weighed and added to the high-stirring cup, and high stirring was performed for 10 min; and then 5 parts by weight of a filtrate reducer sulfomethyl phenolic resin (SMP-I), 5 parts by weight of an anti-collapse agent FRH, 4 parts by weight of anti-stick lubricant FK-10, 0.4 parts by weight of an alkalinity regulator CaO, and 2 parts by weight of a shear-strength improving agent were added. Each time a material was added, high stirring was required for 10 min; and finally, 22 parts by weight of barite were slowly added to the high-stirring cup and stirring was continued for 30 min.

Different parts by weight of the plugging agents in Examples 1 to 3 and Comparative Example 1 (the amount of the plugging agent added is based on the weight of the water-based drilling fluid base slurry) were added to a plurality of parts by the same weight of the water-based drilling fluid base slurry to obtain water-based drilling fluids containing different mass contents and different types of plugging agents. Meanwhile, a water-based drilling fluid without adding the plugging agent, i.e., the base slurry, was set as a blank experimental group. The water-based drilling fluids were aged at 150° C. for 16 h, and subjected to the measurement of performance parameters. The results are shown in Table 2.

Table 2. Performance parameters of water-based drilling fluids formed by different amounts of plugging agents added

| Type | Apparent viscosity AV mPa·s | Plastic viscosity PV mPa·s | Yield point YP Pa | High temperature and high pressure filtration loss |
|---|---|---|---|---|
| Base slurry | 37 | 30 | 7 | 9.2 |
| Base slurry + 0.5% Example 1 | 38 | 31 | 7 | 6.8 |
| Base slurry + 0.5% Example 2 | 38.5 | 30 | 8.5 | 6.0 |
| Base slurry + 0.5% Example 3 | 37.5 | 30 | 7.5 | 6.2 |
| Base slurry + 0.5% Comparative Example 1 | 42 | 33 | 9 | 18.6 |
| Base slurry + 1.0% Example 1 | 39 | 31 | 8 | 6.0 |
| Base slurry + 1.0% Example 2 | 39.5 | 30 | 9.5 | 5.0 |
| Base slurry + 1.0% Example 3 | 39 | 31 | 8 | 5.4 |
| Base slurry + 1.0% Comparative Example 1 | 43.5 | 32 | 11.5 | 15.4 |
| Base slurry + 1.5% Example 1 | 40.5 | 31 | 9.5 | 5.0 |
| Base slurry + 1.5% Example 2 | 41 | 32 | 9 | 4.6 |
| Base slurry + 1.5% Example 3 | 40 | 32 | 8 | 4.8 |
| Base slurry + 1.5% Comparative Example 1 | 43 | 33 | 10 | 14.6 |
| Base slurry + 2.0% Example 1 | 41.5 | 32 | 9.5 | 4.6 |
| Base slurry + 2.0% Comparative Example 2 | 42.5 | 32 | 10.5 | 4.2 |
| Base slurry + 2.0% Comparative Example 3 | 41 | 33 | 8 | 4.2 |
| Base slurry + 2.0% Comparative Example 1 | 42 | 31 | 11 | 13.8 |

Note:
The temperature of HTHP is 150 C. and the pressure is 3.5 MPa.

Note: The temperature of HTHP is 150° C. and the pressure is 3.5 MPa.

It may be seen from Table 2 that the apparent viscosity and plastic viscosity of the water-based drilling fluid slowly increase with the increase of the amount of plugging agent added, and the high-temperature and high-pressure (HTHP) filtration loss significantly decreases with the increase of the amount of plugging agent added; when the amount of plugging agent added exceeds 1.5%, the filtration loss of Examples 1 to 3 is maintained between 4.1 mL and 5.0 mL, which indicates that the plugging agent has good rheological properties and water loss wall-building properties, and can effectively reduce the high-temperature and high-pressure filtration loss of drilling fluid, and can provide better plugging performance even in a high temperature environment, effectively prevent the filtrate from entering the formation, and improve the stability of a well wall. The high-temperature and high-pressure filtration loss of the water-based drilling fluid added with Comparative Example 1 is relatively high. This is because this water-based drilling fluid has undergone significant degradation and has a relatively fast degradation rate, resulting in the inability to effectively plug the formation fractures.

The present application has been disclosed in the above preferred embodiments, but those skilled in the art should understand that these embodiments are only used to describe the present application and should not be construed as limiting the scope of the present application. Further modifications are made without departing from the principles of the present application and such modifications are intended to be included within the scope of the present application.

What is claimed is:

1. A preparation method for a strong salt-resistant self-degradation plugging agent for water-based drilling fluid, comprising the following steps:
   S1: preparing modified polyhydroxyalkanoate, comprising the following steps:
   S11: uniformly dispersing 6-8 parts by weight of unsaturated polyhydroxyalkanoate, 3-4 parts by weight of 2-acrylamide-2-methylpropanesulfonic acid and 0.1-0.3 parts by weight of a dispersant in deionized water, and introducing an inert gas to remove oxygen in a mixed solution;
   S12: adding 0.05-0.1 part by weight of an initiator into the mixed solution of S11, heating to 70° C. to 90° C., and reacting for 12 h to 16 h;

S13: naturally cooling a reaction product of S12, and drying in vacuum to obtain the modified polyhydroxyalkanoate;

S2: modifying lignin by using an ammonium halide salt to prepare quaternized lignin; and S3: melting and blending the quaternized lignin and the modified polyhydroxyalkanoate to obtain the strong salt-resistant self-degradation plugging agent for water-based drilling fluid; wherein the unsaturated polyhydroxyalkanoate is poly(3-hydroxyoctanoate-co-3-hydroxyundecanoate); and the ammonium halide salt is 3-chloro-2-hydroxypropyltrimethylammonium chloride or diallyldimethylammonium chloride.

2. The preparation method for the strong salt-resistant self-degradation plugging agent for water-based drilling fluid according to claim 1, wherein the dispersant is sodium dodecyl sulfate or dehydrated sorbitol monooleate polyoxyethylene ether.

3. The preparation method for the strong salt-resistant self-degradation plugging agent for water-based drilling fluid according to claim 1, wherein the initiator is potassium persulfate or ammonium persulfate.

4. The preparation method for the strong salt-resistant self-degradation plugging agent for water-based drilling fluid according to claim 1, wherein the step S2 comprises:

S21: dissolving 7-8 parts by weight of lignin and 3-4 parts by weight of ammonium halide salt in N,N-dimethylformamide, and adding an alkaline reagent to adjust a pH value to 11-12; and S22: stirring a mixture of S21 at 70° C. to 80° C. for 18 h to 24 h; after the reaction is completed, sequentially performing rotary evaporation, dialysis and purification, and lyophilization at −30° C. to −50° C. on a reaction product to obtain the quaternized lignin.

5. The preparation method for the strong salt-resistant self-degradation plugging agent for water-based drilling fluid according to claim 1, wherein in the step S3, a mass ratio of the modified polyhydroxyalkanoate to the quaternized lignin is 1 to 3.

6. The preparation method for the strong salt-resistant self-degradation plugging agent for water-based drilling fluid according to claim 1, wherein in the step S3, the melting and blending are performed at a temperature of 190° C. to 200° C.

7. A strong salt-resistant self-degradation plugging agent for water-based drilling fluid prepared by the preparation method for the strong salt-resistant self-degradation plugging agent for water-based drilling fluid according to claim 1.

* * * * *